United States Patent
Wu et al.

(10) Patent No.: US 6,862,738 B2
(45) Date of Patent: Mar. 1, 2005

(54) OPTICAL COMPACT DISK DRIVE WITH AN ACOUSTIC-AND-VIBRATION ATTENUATOR

(75) Inventors: Jen-Chen Wu, Chung-Ho (TW); Yi-Wei Lu, Chung-Ho (TW)

(73) Assignee: Micro-Star Int'l Co., Ltd., Chung-Ho (TW)

( * ) Notice: Subject to any disclaimer, the term of this patent is extended or adjusted under 35 U.S.C. 154(b) by 127 days.

(21) Appl. No.: 10/267,405

(22) Filed: Oct. 8, 2002

(65) Prior Publication Data

US 2003/0218956 A1 Nov. 27, 2003

(30) Foreign Application Priority Data

May 22, 2002 (TW) ........................................ 91207362 U

(51) Int. Cl.[7] .......................... G11B 17/03; G11B 33/08
(52) U.S. Cl. ........................................ 720/651; 720/611
(58) Field of Search ............................. 720/648, 649, 720/651, 601, 603, 611; 360/97.02, 97.03, 97.04; 361/690, 691, 692, 693

(56) References Cited

U.S. PATENT DOCUMENTS

| | | | |
|---|---|---|---|
| 6,212,147 B1 | 4/2001 | Ishihara | 369/77.1 |
| 6,317,402 B1 | 11/2001 | Huang et al. | 369/77.1 |
| 6,392,976 B1 | 5/2002 | Lin | 369/77.1 |
| 6,493,310 B1 * | 12/2002 | Kim et al. | 369/263 |
| 2002/0039340 A1 * | 4/2002 | Minase | 369/75.1 |
| 2004/0066277 A1 | 4/2004 | Wu et al. | 369/75.2 |

FOREIGN PATENT DOCUMENTS

| | | | |
|---|---|---|---|
| JP | 10-177755 | * | 6/1998 |
| JP | 2000-357385 | * | 12/2000 |
| JP | 2001-52405 | * | 2/2001 |

* cited by examiner

Primary Examiner—David L. Ometz

(57) ABSTRACT

An optical compact disk drive includes a housing with a top cover, a disk-supporting tray mounted in the housing for supporting a compact disk thereon and cooperating with the top cover to define a gap therebetween, and an acoustic-and-vibration attenuator mounted in the gap to divide the gap into a plurality of angularly spaced apart compartments around a central axis that passes through a center of the compact disk.

4 Claims, 7 Drawing Sheets

US 6,862,738 B2

OPTICAL COMPACT DISK DRIVE WITH AN ACOUSTIC-AND-VIBRATION ATTENUATOR

CROSS-REFERENCE TO RELATED APPLICATION

This application claims priority of Taiwanese Application No. 091207362, filed on May 22, 2002.

BACKGROUND OF THE INVENTION

1. Field of the Invention

This invention relates to an optical compact disk drive, more particularly to an optical compact disk drive with an acoustic-and-vibration attenuator.

2. Description of the Related Art

The data reading speed for optical compact disk drives has been considerably increased in recent years. However, noise and vibration arising from rotations of a compact disk and a motor of the optical compact disk drive are also significantly increased due to the increase of the aforesaid reading speed.

FIGS. 1 to 3 illustrate a conventional optical compact disk drive that includes a housing 90 with a top cover 92 and a bottom cover 911, a mounting seat 91 with a disk-supporting tray 94 for receiving a compact disk 93 thereon, and a motor 913 for driving rotation of the compact disk 93. The conventional optical compact disk drive is disadvantageous in that rotation of the compact disk 93 at a high speed introduces tangential air flow (indicated by arrows (A) shown in FIG. 2) therearound, which, in turn, results in highly turbulent air flow (indicated by arrows (B) shown in FIG. 2) between the compact disk 93 and the top cover 92, which, in turn, results in undesired vibration of the compact disk 93 and loud noise.

SUMMARY OF THE INVENTION

Therefore, it is an object of the present invention to provide an optical compact disk drive with an acoustic-and-vibration attenuator that is capable of overcoming the aforesaid drawbacks.

According to the present invention, there is provided an optical compact disk drive that comprises: a housing confining a chamber therein and including a top cover confining a top side of the chamber; a mounting seat with a disk-supporting tray mounted in the chamber and adapted to support a compact disk thereon, the disk-supporting tray defining a central axis that is adapted to pass through a center of the compact disk on the disk-supporting tray and cooperating with the top cover to define a gap therebetween; and an acoustic-and-vibration attenuator mounted in the gap and adapted to be vertically aligned with the compact disk on the disk-supporting tray. The attenuator divides the gap into a plurality of angularly spaced apart compartments around the central axis in such a manner that air flow resulting from rotation of the compact disk in the chamber is divided into a plurality of streams by virtue of the attenuator, and that each of the resultant streams circulates in a respective one of the compartments.

BRIEF DESCRIPTION OF THE DRAWINGS

In drawings which illustrate embodiments of the invention.

DETAILED DESCRIPTION OF THE PREFERRED EMBODIMENTS

Figure 1:
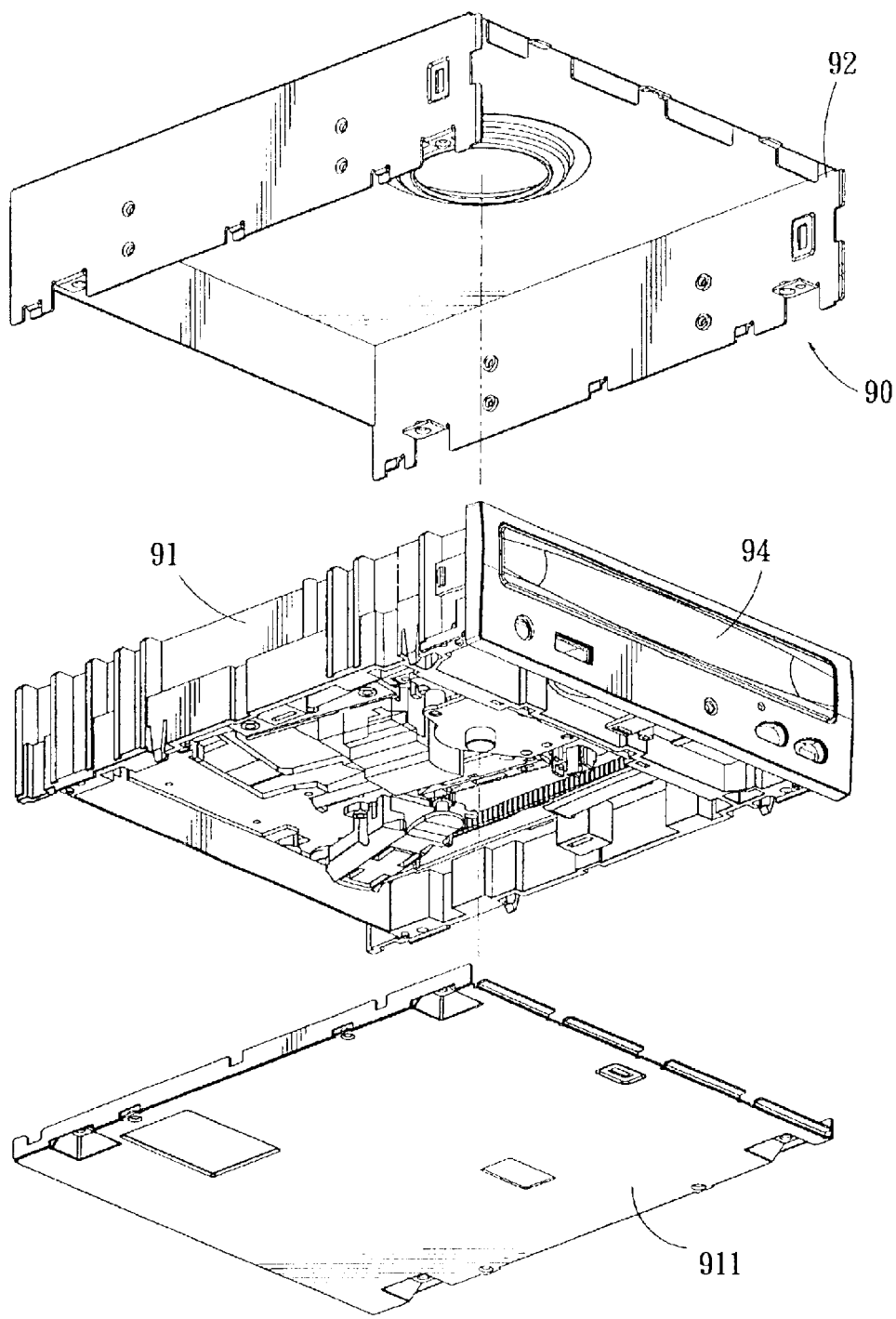
FIG. 1 is an exploded perspective view showing a conventional optical compact disk drive.
Figure 2:
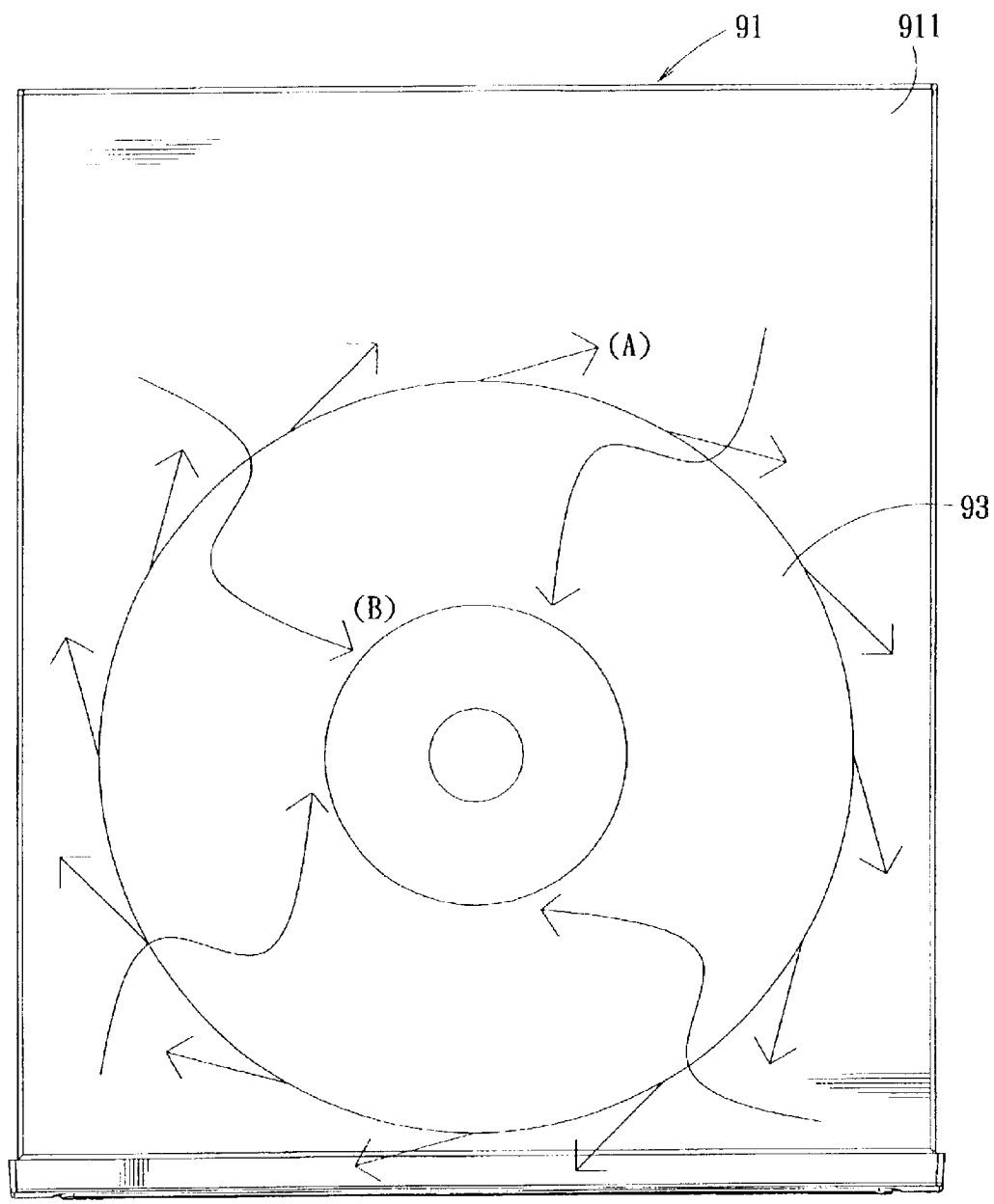
FIG. 2 is a schematic top view showing how air turbulence results upon rotation of a compact disk mounted in the optical compact disk drive of FIG. 1.
Figure 3:
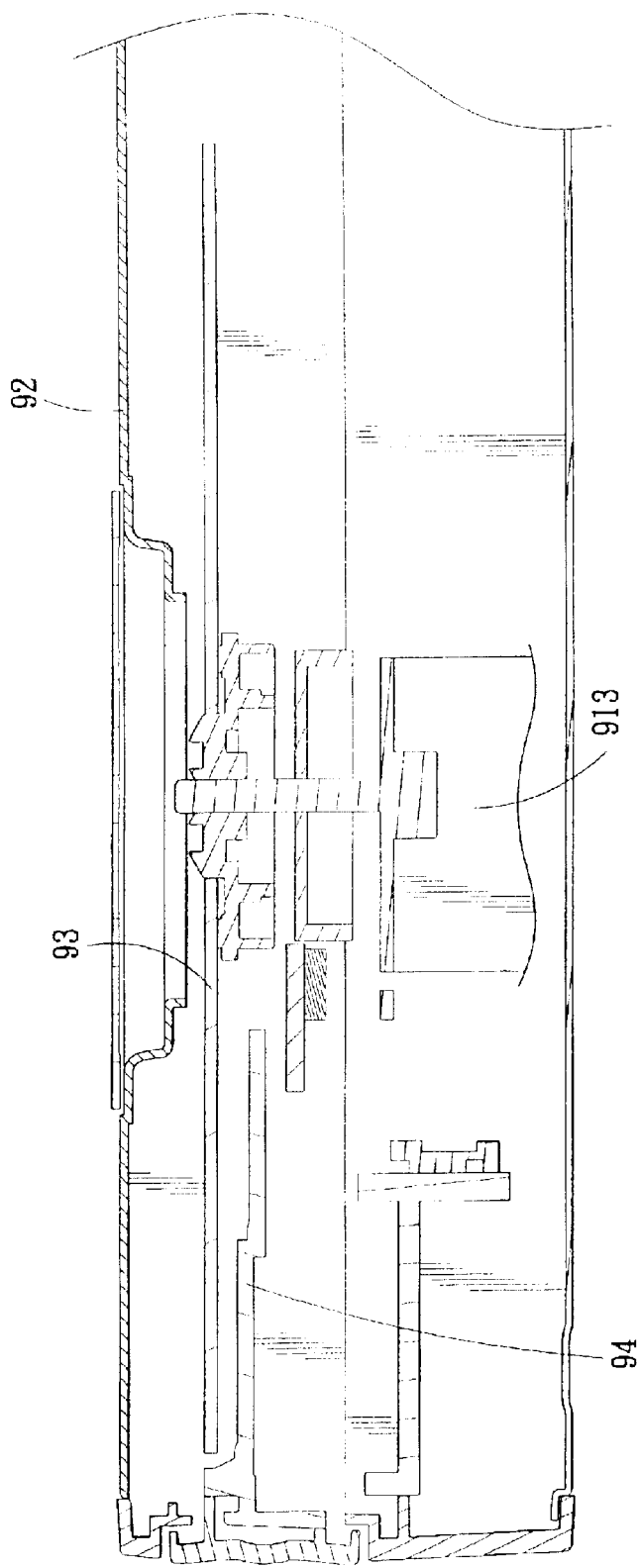
FIG. 3 is a fragmentary sectional view of the optical compact disk drive of FIG. 2.

For the sake of brevity, like elements are denoted by the same reference numerals throughout the disclosure.

Figure 4:
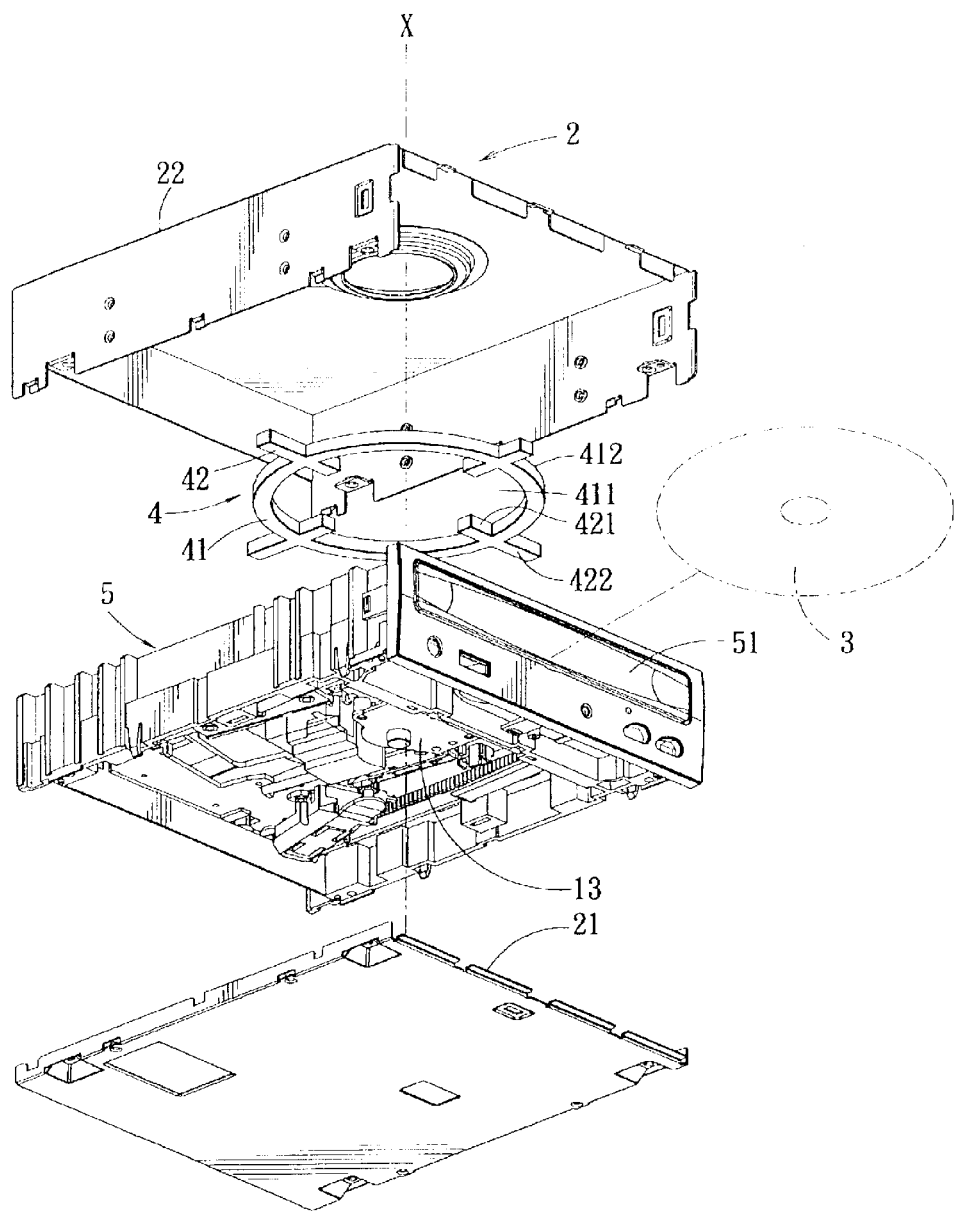
FIG. 4 is an exploded perspective view of a first embodiment of an optical compact disk drive according to this invention.
Figure 5:
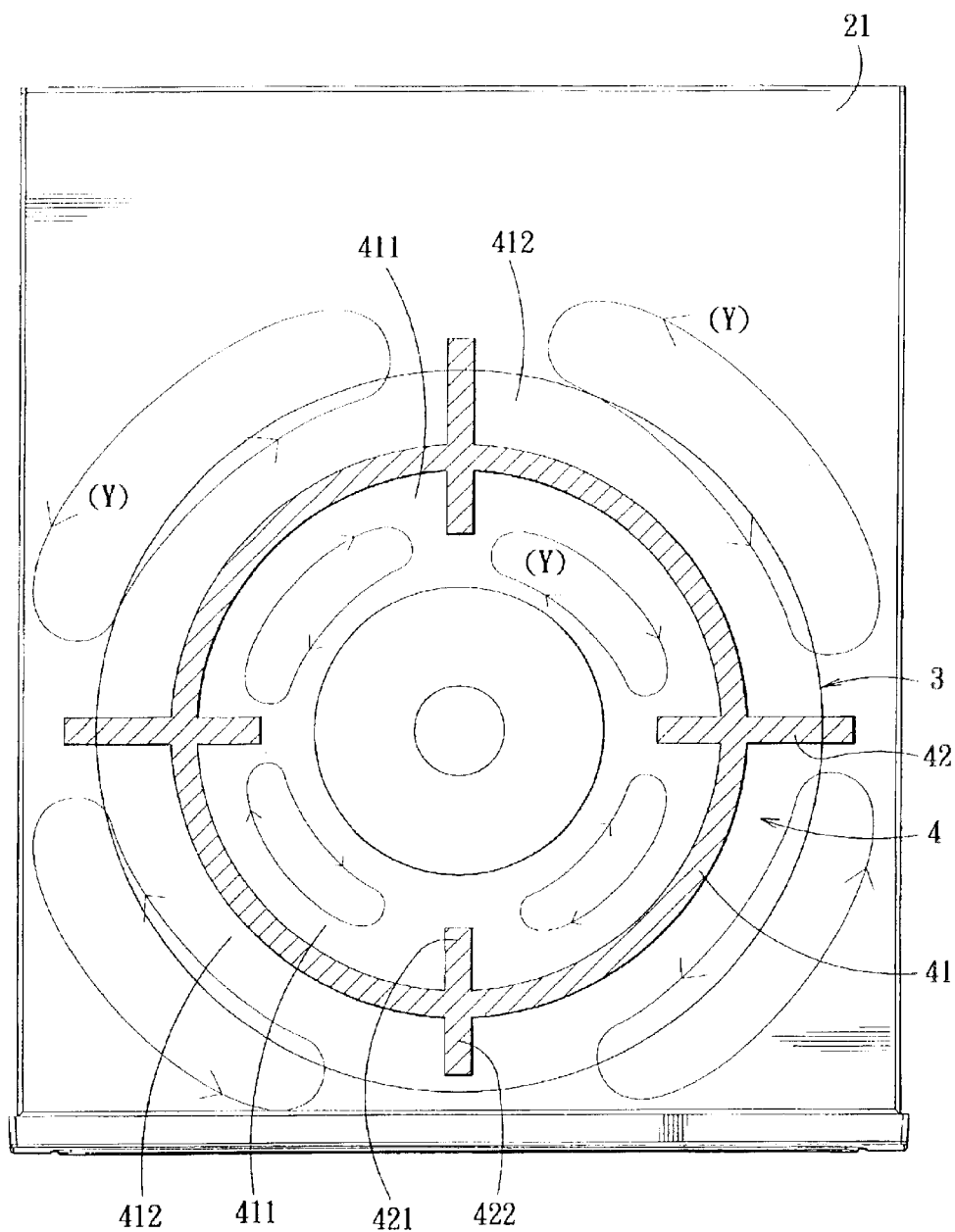
FIG. 5 is a schematic top view showing how air streams are formed upon rotation of a compact disk mounted in the optical compact disk drive of FIG. 4.
Figure 6:
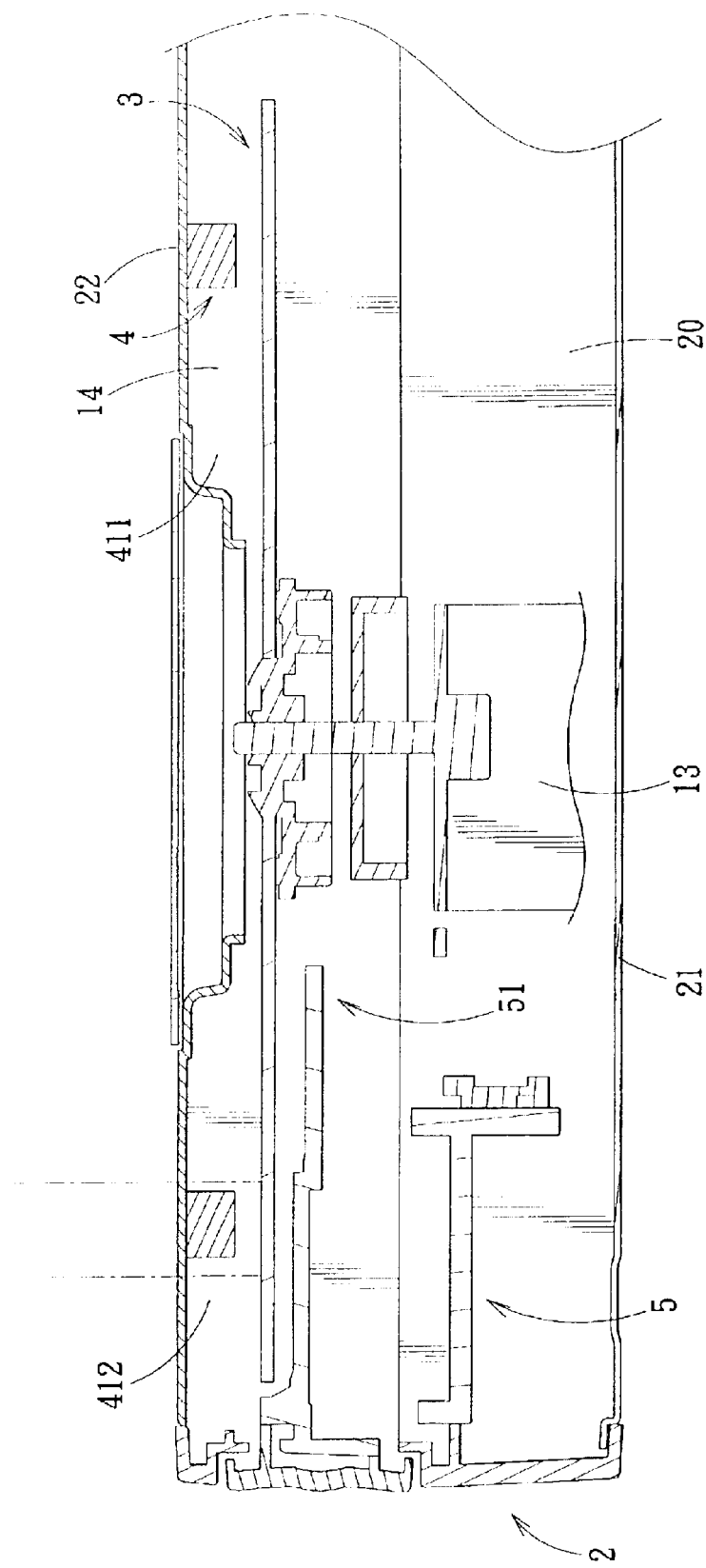
FIG. 6 is a fragmentary sectional view of the optical compact disk drive of FIG. 4.

FIGS. 4 to 6 illustrate a first preferred embodiment of an optical compact disk drive according to this invention. The optical compact disk drive includes: a housing 2 confining a chamber 20 therein and including a top cover 22 confining a top side of the chamber 20 and a bottom cover 21 confining a bottom side of the chamber 20; a mounting seat 5 with a disk-supporting tray 51 mounted in the chamber 20 and adapted to support a compact disk 3 thereon, the disk-supporting tray 51 defining a central axis (X) that is adapted to pass through a center of the compact disk 3 on the disk-supporting tray 51 and cooperating with the top cover 22 to define a gap 14 therebetween; and an acoustic-and-vibration attenuator 4 mounted in the gap 14 and adapted to be vertically aligned with the compact disk 3 on the disk-supporting tray 51. The attenuator 4 divides the gap 14 into a plurality of angularly spaced apart inner and outer compartments 411, 412 around the central axis (X) in such a manner that air flow resulting from rotation of the compact disk 3 in the chamber 20 is divided into a plurality of streams (indicated as arrows (Y) shown in FIG. 5) by virtue of the attenuator 4, and that each of the resultant streams (Y) circulates in a respective one of the inner and outer compartments 411, 412.

The attenuator 4 is mounted on the top cover 22 via an adhesive, projects from the top cover 22 into the gap 14 in a direction toward the disk-supporting tray 51, and includes an annular rib 41 and a plurality of angularly spaced apart radial ribs 42, each of which has a first section 422 extending radially and outwardly from the annular rib 41, and a second section 421 extending radially and inwardly from the annular rib 41. Each of the annular rib 41 and the radial ribs 42 has a square cross-section.

Figure 7:
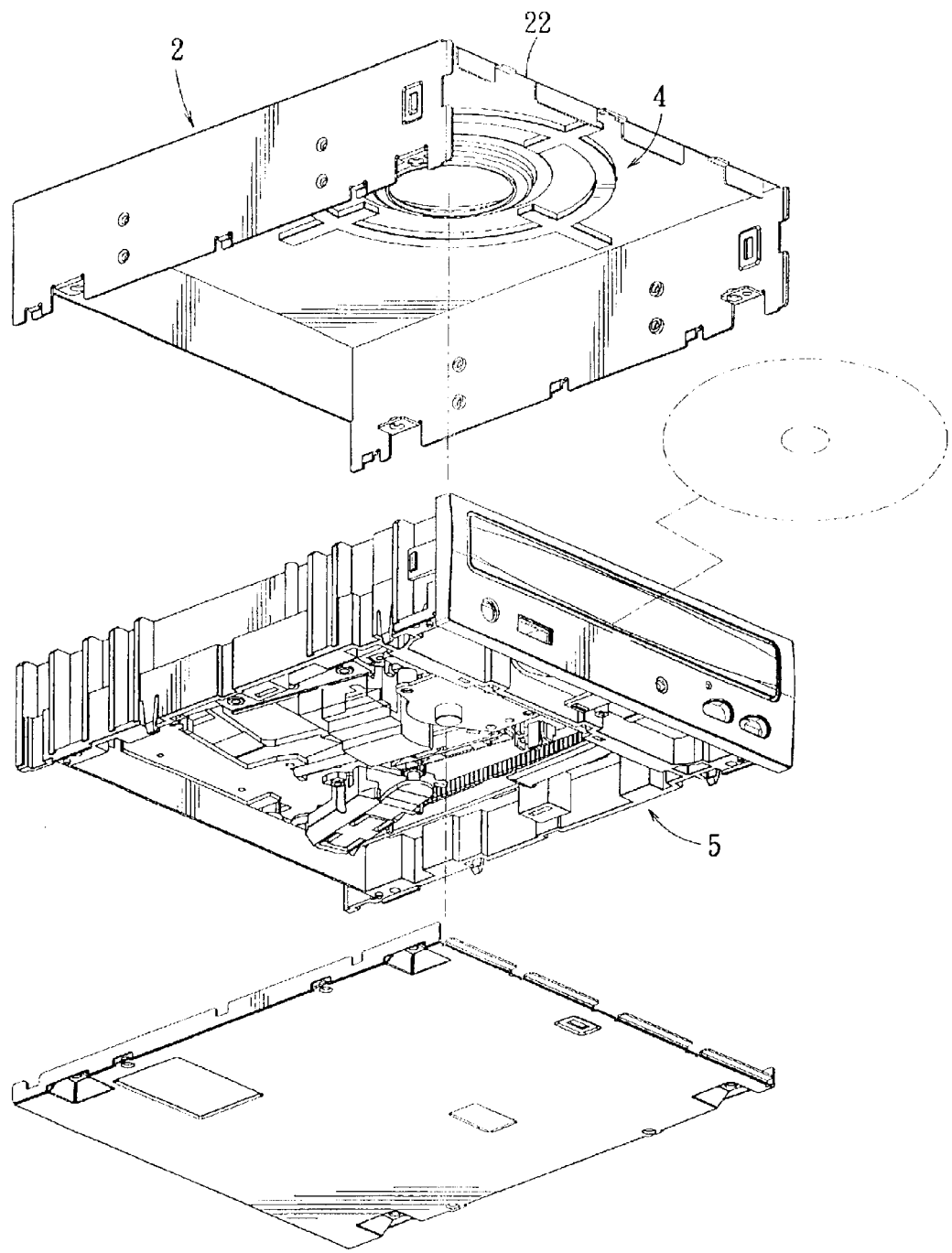
FIG. 7 is an exploded perspective view of a second embodiment of the optical compact disk drive according to this invention.

FIG. 7 illustrates a second preferred embodiment of the optical compact disk drive of this invention, which is similar to the previous embodiment, except that the attenuator 4 is integrally formed with the top cover 22 by punching the top cover 22.

By virtue of the configuration of the attenuator 4, the aforesaid noise and vibration drawbacks as encountered in the prior art can be considerably reduced.

With the invention thus explained, it is apparent that various modifications can be made without departing from the spirit of the present invention. It is therefore intended that the invention be limited only as recited in the appended claims.

We claim:

1. An optical compact disk drive, comprising:

a housing confining a chamber therein and including a top cover confining a top side of said chamber;

a mounting seat with a disk-supporting tray mounted in said chamber and adapted to support a compact disk thereon, said disk-supporting tray defining a central axis that is adapted to pass through a center of the compact disk on said disk-supporting tray and cooperating with said top cover to define a gap therebetween; and an acoustic-and-vibration attenuator mounted in said gap and adapted to be vertically aligned with the compact disk on said disk-supporting tray, said attenuator dividing said gap into a plurality of angularly spaced apart compartments around said central axis in such a manner that air flow resulting from rotation of the compact disk in said chamber is divided into a plurality of streams by virtue of said attenuator, and that each of the resultant streams circulates in a respective one of said compartments, wherein said attenuator is mounted on and projects from said top cover into said gap in a direction toward said disk-supporting tray, and includes an annular rib and a plurality of angularly spaced apart radial ribs, each of which has a first section extending radially and outwardly from said annular rib.

2. The optical compact disk drive of claim 1, wherein each of said radial ribs further has a second section extending radially and inwardly from said annular rib.

3. The optical compact disk drive of claim 2, wherein each of said annular rib and said radial ribs has a square cross-section.

4. The optical compact disk drive of claim 1, wherein said attenuator is integrally formed with said top cover by punching said top cover.

\* \* \* \* \*